United States Patent
Baker et al.

(10) Patent No.: US 7,650,297 B1
(45) Date of Patent: Jan. 19, 2010

(54) SYSTEM AND METHOD FOR MANAGING RETURNABLE CONTAINERS

(75) Inventors: Steven Baker, Piqua, OH (US); Alan Yacobozzi, Marysville, OH (US); Helena Porczak, Naperville, IL (US); Catalina Reasoner, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 779 days.

(21) Appl. No.: 10/728,322

(22) Filed: Dec. 4, 2003

(51) Int. Cl.
*G06Q 10/00* (2006.01)

(52) U.S. Cl. .............................. 705/28; 705/8; 705/10; 705/22

(58) Field of Classification Search .................... 705/28
See application file for complete search history.

(56) References Cited

U.S. PATENT DOCUMENTS

| | | | |
|---|---|---|---|
| 6,463,345 B1 * | 10/2002 | Peachey-Kountz et al. .... | 700/99 |
| 6,634,506 B2 | 10/2003 | Beal et al. .................... | 209/630 |
| 2002/0069141 A1 | 6/2002 | Kawamura et al. ............ | 705/28 |
| 2002/0069210 A1 * | 6/2002 | Navani et al. ............ | 707/104.1 |
| 2002/0072956 A1 * | 6/2002 | Willems et al. ............... | 705/10 |
| 2002/0161878 A1 | 10/2002 | Okamura et al. ............ | 709/223 |
| 2003/0014314 A1 * | 1/2003 | Griep et al. .................... | 705/15 |
| 2003/0177050 A1 * | 9/2003 | Crampton et al. .............. | 705/8 |

OTHER PUBLICATIONS

Gould, Lawrence S. ERP: complexities, ironies, and advances. Jul. 2002. Automotive Design & Production , vol. 114 , No. 7 , p. 44(3).*

\* cited by examiner

*Primary Examiner*—F. Zeender
*Assistant Examiner*—Fawaad Haider
(74) *Attorney, Agent, or Firm*—Standley Law Group LLP

(57) ABSTRACT

The present invention is a system and method for managing returnable containers according to a manufacturer's production schedule. It provides capabilities to move and adjust container inventory throughout the entire parts supply chain. Movements of the containers are tracked to ensure each supplier has at all times a physical inventory of containers that is adequate to ship parts in a timely manner to the manufacturer's facilities. Container movement is controlled through the use of process flows and their relationship with physical locations called "inventory holding areas." An inventory holding area reflects the quantity of containers that are held within that portion of the supply chain. Each of these portions is represented by an "inventory holding area type." The system and method operate based on the function of the inventory holding area types and the relationships between each other.

12 Claims, 36 Drawing Sheets

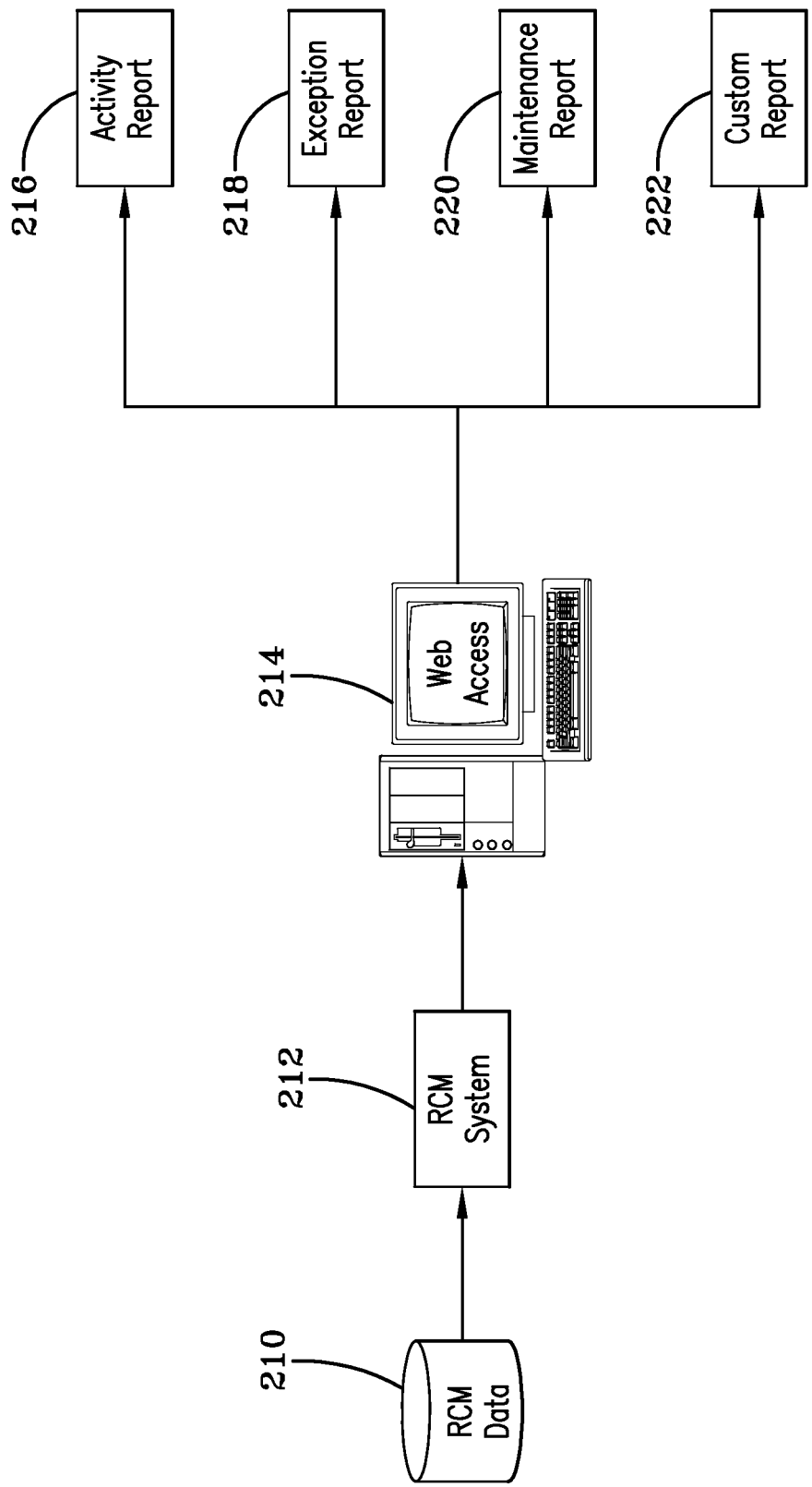

| HOME | ADMINISTRATION | PROCESS FLOW | CONTAINER INVENTORY | SHIPPING/RECEIVING | REPORTING |

<u>Inventory Buckets</u>  <u>Process Flows</u>  <u>Process Flow Types</u>

Returnable Container Management System
Inventory Buckets: Maintain Inventory Buckets – Create New

[Tips]

Create an Inventory Bucket: Complete the form for an Inventory Bucket then click "Submit". — 230
Required fields are bold.

Inventory Bucket Name: [_____]  Description: [_____]

Inventory Bucket Type: [--Select One--▾]

Supplier: [--Select One--▾] [Lookup]  Plant: [--Select One--▾]

— 232

Country [▾]  Location: [_____]

Address 1: [_____]

Address 2: [_____]

City: [_____]

State: [▾]  Zip Code: [_____]

[Submit]  [Reset]  [Return to Maintain Inventory Buckets]

FIG-6

Required fields are bold.

Plant: Plant 1
Process Flow Type: SOH-CC-PLT-RCC

SOH → CC → PLT → RCC → SIE

Process Flow Name: Flow 1
Description: [< >]

Supplier: Supplier 1
SOH: Supplier 1
CC: TP1 [v]
PLT: TPA
RCC: RCC1 [v]
SIE: Supplier 1

Supplier Verify at Receipt: ● No  ○ Yes

Copy This Flow

Inventory Bucket Relationship parameters:

| Relationship | From Inventory Bucket | To Inventory Bucket |
|---|---|---|
| SOH-CC | Supplier 1 | TP1 |
| CC-PLT | TP1 | TPA |

FROM FIG-7A

| PLT-RCC | TPA | RC 1 |
|---|---|---|
| RCC-SIE | RCC 1 | Supplier 1 |
| SIE-SOH | Supplier 1 | Supplier 1 |

244

Container Types assigned to this Flow:

246

| Container Type | Description | Effective Date | Expiration Date | Assign to Flow? |
|---|---|---|---|---|
| AP | PALLET | 06/09/2003 ☐ | 12/31/9999 ☐ | ☑ |
| A1 | PALLET BOX | 06/09/2003 ☐ | 12/31/9999 ☐ | ☑ |
| A3 | pallet box | 06/09/2003 ☐ | 12/31/9999 ☐ | ☑ |
| B | TOTE | 06/09/2003 ☐ | 12/31/9999 ☐ | ☑ |

| | | | Check All | Uncheck All |

| Copy This Flow | | Update | Reset | Delete | Print Details |

FIG-7B

| Home | Alerts | Supplier Development | Parts Delivery | Parts Quality | Quotes | Returnable Containers | Supplier Profile | References | Training CBT |

HOME | ADMINISTRATION | PROCESS FLOW | SHIPPING/RECEIVING | REPORTING

MAINTAIN SUPPLIER PROFILE

Returnable Container Management System
Administration: Maintain Supplier Profile

[Tips]

go to bottom of page

Search Suppliers options: Enter a Supplier Name OR Supplier Number then click "Submit".

Search by: ● Supplier Name
○ Supplier Number

[          ]

[Submit]  [Reset]

Search Results                                                    1 Records
Click on a record to see the details below.

| Supplier Number | Supplier Name | Company |
|---|---|---|
| 00000000 | Supplier 1 | HAM |

250 — (Returnable Container Management System / Administration)
252 — (Search Results)

FROM FIG-8A

Maintain a Supplier: Change the necessary information then click "Update".
Required fields are bold.

Supplier Number: 081140  Supplier Name: ABC
Location Code: 01  Company: XYZ

Country: USA
Address 1: 1234 CBA Dr.  Location: 01
Address 2:
City: Anywhere
State: OH  Zip: 01010

Contracted Container Types:

| Container Types | Description | Shipping Discrepancy Notification |
|---|---|---|
| AP | PALLET | ☐ |
| C | MODULAR TOTES | ☐ |
| C2 | MODULAR TOTE | ☐ |
| D1 | MODULAR TOTE | ☐ |

Print Details 254
256

FIG-8B

| Home | Alerts | Supplier Development | Parts Delivery | Parts Quality | Quotes | Returnable Containers | Supplier Profile | References | Training CBT |

HOME | ADMINISTRATION | PROCESS FLOW | SHIPPING/RECEIVING | REPORTING

INVENTORY BUCKETS

Returnable Container Management System — 260
Inventory Buckets: Maintain Inventory Buckets Search Inventory Buckets options: Select/enter filter option(s) then click "Submit".    [Tips]    go to bottom of page Plant: [AEP]    Process Flow: [Supplier 1 to NKP]

Supplier No.: [    ] [Lookup]

Inventory Bucket Name: [—Select One—  ▽]

Inventory Bucket Type: [RCC Returnable Conta  ◁ ]    Container Type: [AP PALLET  ◁ ]
                      [CC Consolidation Cen   ]                      [A1 PALLET       ]
                      [SOH Supplier—On Hand ▷]                       [A10001125     ▷ ]

[Submit]   [Reset]

FROM FIG-9A

Search Results  2 Records

Click on a record to see the details below.

| Inventory Bucket Name | IB Type | Supplier | Plant | Process Flow | Container Type(s) |
|---|---|---|---|---|---|
| Supplier 1 SIE | SIE | 00000000 Supplier 1 | AEP | Supplier 1 to NKP | AP,C,C2,D1 |
| Supplier 1 SOH | SOH | 00000000 Supplier 1 | AEP | Supplier 1 to NKP | AP,C,C2,D1 |

[ Print List ]

Maintain an Inventory Bucket: Change the necessary information then click "Update". Required fields are bold.

Inventory Bucket Name: Supplier 1 SOH  Description:
Inventory Bucket Type: SOH
Supplier: 00000000 Supplier 1 go to bottom of page

FROM FIG-9B

Country:
Address 1:
Address 2:
City:
State:  Zip: 00000  Location: 00

Included in Process Flows:

| Plant | Process Flow | Process Flow Type |
|---|---|---|
| AEP | Supplier 1 to NKP | SOH-CC-PLT-RCC |

— 266

Container Types:

| Container Types | Quantities |
|---|---|
| AP | 127 |
| C | 908 |
| C2 | 194 |
| D1 | 462 |

Print Details return to top of page

FIG-9C

THIS SHIPPING ORDER          SHIPPER'S NO. 002033          page 1 of 1

CARRIER: XYZ at: Address          date: 2/26/2003          from: Manufacturer

Cosigned to: Supplier Name     Trailer or Container No.: 1566233

Destination: Address          Seal No.:

Remarks: RETURNABLE CONTAINERS

| No. of Shipping Units | Kind of packages, description of articles, special marks and exceptions | *Weight (Subject to corr) | Class or Rate | Check Column |
|---|---|---|---|---|
| 22 | SR000200  TANK ASSY, FUEL | 6791 lbs/ 3080 kg | | |

FROM FIG-10A

Received $ _____
_____ Per _____
_____ x _____ PREPAID
_____ x _____
Charges Advanced $ _____
_____ Agent, per _____

_____ Per _____
_____ Shipper, per _____
Manufacturer's Plant _____
Permanent post-office address of shipper Manufacturer's Address _____

| Home | Alerts | Supplier Development | Parts Delivery | Parts Quality | Quotes | Returnable Containers | Returnable Containers | Supplier Profile | References | Training CBT |

HOME | ADMINISTRATION | PROCESS FLOW | SHIPPING/RECEIVING | REPORTING
RECORD RECEIPT OF EMPTIES   REQUEST ADJUSTMENT

Returnable Container Management System
Record Receipt of Empties: List of Shipments                                        [Tips]

Select a Shipment to view.                                           go to bottom of page Click on a record to see the details below.

| Receipt Status | BOL No. | Actual Departure Date & Time | Ship From Location | Ship To Location | Truck/ Trucks | Receipt Type |
|---|---|---|---|---|---|---|
| DEPARTED | 680 | 02/04/2003 15:54 | NKP RCC | Supplier 1 SIE | 0/0 | Manual |

⎯ 280

Receipt Status: DEPARTED
Bill of Lading No.: 680                    Ship From Location: NKP RCC
Actual Departure                            Ship To Location: Supplier 1 SIE
  Date & Time: 02/04/2003 15:54            Receipt Type: Manual
Truck or Trucks: 0/0                        Received By: --
Trailer No.: 5536                           Receipt Date & Time: --

⎯ 282
                                                                    return to top of page

| Home | Alerts | Supplier Development | Parts Delivery | Parts Quality | Quotes | Returnable Containers | Supplier Profile | References | Training CBT |

HOME | ADMINISTRATION | PROCESS FLOW | SHIPPING/RECEIVING | REPORTING

RECORD RECEIPT OF EMPTIES    REQUEST ADJUSTMENT

Returnable Container Management System
Record Receipt of Empties: List of Shipments                                  [Tips]

Select a Shipment to view.                                          go to bottom of page Click on a record to see the details below.

| Receipt Status | BOL No. | Actual Departure Date & Time | Ship From Location | Ship To Location | Truck/Trucks | Receipt Type |
|---|---|---|---|---|---|---|
| DEPARTED | 368 | 01/20/2003 22:26 | NKP RCC | Supplier 1 SIE | 1/1 | Auto |
| DEPARTED | 332 | 01/17/2003 21:36 | NKP RCC | Supplier 1 SIE | 1/1 | Auto |
| DEPARTED | 309 | 01/16/2003 23:20 | NKP RCC | Supplier 1 SIE | 1/1 | Auto |
| DEPARTED | 279 | 01/15/2003 21:54 | NKP RCC | Supplier 1 SIE | 1/1 | Auto |
| DEPARTED | 423 | 01/22/2003 21:13 | NKP RCC | Supplier 1 SIE | 1/1 | Auto | go to bottom of page

Receive a Shipment, Print Shipment Details or Report a Discrepancy:
  Receipt Status: DEPARTED    Ship From Location: NKP RCC
  Bill of Lading No.: 368    Ship To Location: Supplier 1 SIE
  Actual Departure Date & Time: 01/20/2003 22:26    Receipt Type: Auto
  Truck or Trucks: 1/1    Received By: Auto
  Trailer No.: 17008    Receipt Date & Time: --

FROM FIG-12A

Container Types:

| Container Type | Description | Shipped Quantity |
|---|---|---|
| AP | PALLET | 14 |
| C | MODULAR TOTES | 336 |

[ Print Shipment Details ]   [ Report Shipping Discrepancy ]

return to top of page

| Home | Alerts | Supplier Development | Parts Delivery | Parts Quality | Quotes | Returnable Containers | Supplier Profile | References | Training CBT |

HOME | ADMINISTRATION | PROCESS FLOW | SHIPPING/RECEIVING | REPORTING
RECORD RECEIPT OF EMPTIES    REQUEST ADJUSTMENT

Returnable Container Management System — 300
Record Receipt of Empties: Report a Shipping Discrepancy Report a Shipping Discrepancy: Complete the form then click "Submit".   [Tips]

Receipt Status: DEPARTED    Ship From Location: NKP RCC
Bill of Lading No.: 368     Ship To Location: Supplier 1 SIE
Actual Departure Date & Time: 01/20/2003 22:26    Receipt Type: Auto
Truck or Trucks: 1/1        Received By: Auto
Trailer No.: 17008          Receipt Date & Time: -- go to bottom of page

Container Types: — 302

| Container Type | Description | Quantity Shipped | Quantity Received |
|---|---|---|---|
| AP | PALLET | 14 | ☐ |
| C2 | MODULAR TOTE | 336 | ☐ |

FROM FIG-13A

Add Container Types:

| Container Type | Quantity Received | |
|---|---|---|
| | | Add |

306

Comments:

Submit   Reset   Cancel return to top of page

FIG-13B

| Home | Alerts | Supplier Development | Parts Delivery | Parts Quality | Quotes | Returnable Containers | Supplier Profile | References | Training CBT |

HOME | ADMINISTRATION | PROCESS FLOW | SHIPPING/RECEIVING | REPORTING
RECORD RECEIPT OF EMPTIES   REQUEST ADJUSTMENT

Returnable Container Management System — 310
Request Container Inventory Adjustment: Pending Requests View Pending Shipping Discrepancies or Adjustment Requests or create a new request.   [Tips]

go to bottom of page

Click on a record to see the details below.

| Request Date & Time | Supplier Name | Requested By | Request Type | Requestor's Comments | Request Status | Processing Comments |
|---|---|---|---|---|---|---|
| 02/04/2003 11:06 — 312 | Supplier 1 | a1@supplier1.com | SHIPPING DISCREPANCY | | OPEN | -- |

[Create New Adjustment Request]

FROM FIG-14A go to bottom of page

Pending Request Details

Request Date & Time: 02/04/2003 11:06    Request Type: SHIPPING DISCREPANCY
Supplier: Supplier 1    Requested By: a1@supplier1.com
Request Comments:

Request Status: OPEN    Request Status
Processing Comments: --    Date & Time: --

Bill of Lading No.: 368    Ship From Location: NKP RCC
Actual Departure    Ship To Location: Supplier 1 SIE
Date & Time: 01/20/2003 22:26

314

Container Types:

| Container Type | Shipped Quantity | Received Quantity |
|---|---|---|
| AP | 14 | 13 |
| C2 | 336 | 300 |

316

[Print Details]

return to top of page

FIG-14B

| Home | Alerts | Supplier Development | Parts Delivery | Parts Quality | Quotes | Returnable Containers | Supplier Profile | References | Training CBT |

HOME | ADMINISTRATION | PROCESS FLOW | SHIPPING/RECEIVING | REPORTING

RECORD RECEIPT OF EMPTIES    REQUEST ADJUSTMENT

Returnable Container Management System
Request Container Inventory Adjustment: Request Adjustment Create an Adjustment Request: Complete the form then click "Submit".  [Tips]

Supplier: [00000000 Supplier 1 ▼]

go to bottom of page

Container Types:

| Container Type | System On-Hand Inventory | Total Physical On-Hand Inventory | |
|---|---|---|---|
| | | Functional On-Hand | Damaged On-Hand |
| AP | 127 | ☐ | ☐ |
| C | 908 | ☐ | ☐ |
| C2 | 194 | ☐ | ☐ |
| D1 | 462 | ☐ | ☐ |

FROM FIG-15A

Add Container Types:

Container Type | Physical On-Hand Inventory | Add

Comments:

Submit | Reset | Cancel return to top of page

FIG-15B

| Home | Alerts | Supplier Development | Parts Delivery | Parts Quality | Quotes | Returnable Containers | Supplier Profile | References | Training CBT |

HOME | ADMINISTRATION | PROCESS FLOW | SHIPPING/RECEIVING | REPORTING

RECORD RECEIPT OF EMPTIES     REQUEST ADJUSTMENT

Returnable Container Management System
Request Container Inventory Adjustment: Pending Requests                    [Tips]

View Pending Shipping Discrepancies or Adjustment Requests or create a new request.     go to bottom of page Click on a record to see the details below.

| Request Date & Time | Supplier Name | Requested By | Request Type | Requestor's Comments | Request Status | Processing Comments |
|---|---|---|---|---|---|---|
| 02/04/2003 11:06 | Supplier 1 | a1@supplier1.com | SHIPPING DISCREPANCY | | OPEN | -- |
| 02/04/2003 11:09 | Supplier 1 | a1@supplier1.com | ON-HAND INVENTORY ADJUSTMENT | | OPEN | -- |

330

[Create New Adjustment Request]

FROM FIG-16A

Pending Request Details

Request Date & Time: 02/04/2003 11:09   Request Type: ON-HAND INVENTORY ADJUSTMENT
Supplier: Supplier 1   Requested By: a1@supplier1.com
Request Comments:

Request Status: OPEN   Request Status
Processing Comments: --   Date & Time: -- go to bottom of page

Container Types:

| Container Type | System On-Hand Inventory | Total Physical On-Hand Inventory | | Difference |
| | | Functional On-Hand | Damaged On-Hand | (Physical-System) |
|---|---|---|---|---|
| AP | 127 | 120 | 7 | 0 |

Added Container Types:

| Container Type | System On-Hand Inventory | Physical On-Hand Inventory |
|---|---|---|
| A3-315 ? | 0 | 20 |

[Print Details]

return to top of page

| Home | Alerts | Supplier Development | Parts Delivery | Parts Quality | Quotes | Returnable Containers | Supplier Profile | References | Training CBT |

HOME | ADMINISTRATION | PROCESS FLOW | SHIPPING/RECEIVING | REPORTING
VIEW CONTAINER INVENTORY    VIEW CONTAINER ALLOCATION

Returnable Container Management System
View Container Inventory: Supplier's On-Hand Inventory Specify the report criteria then select "Submit".

Container Type: [All / AP PALLET / A1 PALLET BOX]

Supplier: [All 00000000 Supplier 1] [Lookup]

Inventory Bucket Type: [All / SOH Supplier-On Hand / SIE Supplier In-Transit]

[Submit]  [Reset]

340 ⎯

[Tips]

go to bottom of page

Supplier's On-Hand Inventory Report

Container Type:      ALL          Supplier:    ALL
Inventory Bucket Type: ALL

FROM FIG-17A

Click on a row to expand or collapse it.                    Expand All    Collapse All

| Container Type | Supplier | Inventory Bucket | Quantity | SIF |
|---|---|---|---|---|
| AP | | | 131 | 12 |
| | 00000000 Supplier 1 | | | |
| | | Supplier 1 SOH | 127 | 12 |
| | | Supplier 1 SIE | 4 | |
| C | | | 908 | 11 |
| | 00000000 Supplier 1 | | | |
| | | Supplier 1 SOH | 908 | 11 |
| | | Supplier 1 SIE | 0 | |
| C2 | | | 290 | 276 |
| | 00000000 Supplier 1 | | | |
| | | Supplier 1 SOH | 194 | 276 |
| | | Supplier 1 SIE | 96 | |
| D1 | | | 462 | 32 |
| | 00000000 Supplier 1 | | | |
| | | Supplier 1 SOH | 462 | 32 |
| | | Supplier 1 SIE | 0 | | return to top of page

[Print Report]  [Cancel]

FIG-17B

| Home | Alerts | Supplier Development | Parts Delivery | Parts Quality | Quotes | Returnable Containers | Supplier Profile | References | Training CBT |

HOME | ADMINISTRATION | PROCESS FLOW | SHIPPING/RECEIVING | REPORTING
VIEW CONTAINER INVENTORY  VIEW CONTAINER ALLOCATION

Returnable Container Management System
View Container Allocation: Shipping versus Allocation Specify a Container Allocation Report.                          go to bottom of page Report:  ● Shipping versus Allocation   ○ Allocation Management   ○ Shipping History   [Tips]

Specify the report criteria then select "Submit".

Associate      [All     <]
Number:        [0001263  ]
               [0001824 >]

Container Type: [All       <]
                                                              [AP PALLET  ]
Supplier:      [All             <]                            [A1 PALLET BOX >]
               [00000000 Supplier 1]
               [                >]   [Lookup]

[Submit]  [Reset]

Shipment versus Allocation Report – Summary                    go to bottom of page

TO FIG-18B
FIG-18A

FROM FIG-18A

Associate ALL Number:     Supplier: ALL     Container Type: ALL

Click on a row to view its details.

| Supplier | Container Type | Plant | Allocation Level | Safety Stock | Allocation Requirement Quantity | Discrepancy Quantity | % Fill |
|---|---|---|---|---|---|---|---|
| 00000000 Supplier 1 | AP | Total | -- | 0 | 85 | 46 | 154% |
|  |  | AEP | 85 | 0 | 85 |  |  |
| 00000000 Supplier 1 | C | Total | -- | 0 | 60 | 848 | 1513% |
|  |  | AEP | 60 | 0 | 60 |  |  |
| 00000000 Supplier 1 | C2 | Total | -- | 0 | 1532 | -1242 | 18% |
|  |  | AEP | 1,532 | 0 | 1532 |  |  |

[Print Summary Report]     [Cancel]

FIG—18B

Shipment versus Allocation Report – Detail

| Supplier | Container Type | Plant | Allocation Level | Safety Stock | Alloc. Req. Quantity | Discrepancy Quantity | % Fill |
|---|---|---|---|---|---|---|---|
| 00000000 Supplier 1 | AP | Total | -- | 0 | 85 | 46 | 154% | go to bottom of page — 356

| Supplier | Cont. Type | Ship From | Truck or Trucks | Depart Date Time | Calc. Qty. | Actual Qty. | Discr. Qty. | Assoc. No. | BOL No. |
|---|---|---|---|---|---|---|---|---|---|
| 00000000 Supplier 1 | AP | NKP RCC | 1/1 | 01/03/2003 00:03 | 0 | 13 | 13 | -- | 21 |
| 00000000 Supplier 1 | AP | NKP RCC | 1/1 | 01/03/2003 22:07 | 0 | 12 | 12 | -- | 45 |
| 00000000 Supplier 1 | AP | NKP RCC | 1/1 | 01/06/2003 23:58 | 0 | 7 | 7 | -- | 72 |
| 00000000 Supplier 1 | AP | NKP RCC | 1/1 | 01/08/2003 01:01 | 0 | 9 | 9 | -- | 93 |
| 00000000 Supplier 1 | AP | NKP RCC | 1/1 | 01/08/2003 21:48 | 0 | 14 | 14 | -- | 122 |
| 00000000 Supplier 1 | AP | NKP RCC | 1/1 | 01/09/2003 20:13 | 0 | 15 | 15 | -- | 152 |

360  362  364

[Print Detail Report]  [Cancel]

return to top of page

| Home | Alerts | Supplier Development | | | | | | | | Training CBT |
|---|---|---|---|---|---|---|---|---|---|---|
| | | | ADMINISTRATION | PROCESS FLOW | Parts Delivery | Parts Quality | Quotes | Returnable Containers | Supplier Profile | References |
| | | | | | | | | SHIPPING/RECEIVING | REPORTING | |

HOME | ADMINISTRATION | PROCESS FLOW | SHIPPING/RECEIVING | REPORTING
VIEW CONTAINER INVENTORY | VIEW CONTAINER ALLOCATION

Returnable Container Management System
View Container Allocation: Allocation Management Specify a Container Allocation Report.

Report: ○ Shipping versus Allocation    ● Allocation Management    ○ Shipping History

[Tips]     go to bottom of page

370 ——— Specify the report criteria then select "Submit".

Transaction Type: [All / ALLOCATION CHANGE / SAFETY STOCK CHANGE]

Supplier: [All / 00000000 Supplier 1]    [Lookup]

Plant: [All / AEP]

Container Type: [All / AP PALLET / A1 PALLET BOX / ◁ □ ▷]

View By: Select Date Range OR Inventory Movement Type

● Date Range        Begin Date: [01/01/2003] □
                    End Date:  [02/04/2003] □

○ Transactions    [Current Day ▽]

[Submit]  [Reset]

TO FIG-19B
FIG-19A

FROM FIG-19A

Allocation Management Report                                    go to bottom of page Transaction Type: ALL                          Plant: ALL
Supplier: ALL                                  Container Type: ALL
View By: Date Range: 01/01/2003 to 02/04/2003  Transactions: --

| Transaction Type | Supplier | Plant | Container Type | Allocation Quantity | Safety Stock | Timestamp | Associate No. |
|---|---|---|---|---|---|---|---|
| ALLOCATION CHANGE | 00000000 Supplier 1 | AEP | AP | 89 | | 02/04/2003 11:14 | 0014484 |
| SAFETY STOCK CHANGE | 00000000 Supplier 1 | AEP | C2 | | 50 | 02/04/2003 11:14 | 0014484 | return to top of page

[Print Report]   [Cancel]

| Home | Alerts | Supplier Development | Parts Delivery | Parts Quality | Quotes | Returnable Containers | Supplier Profile | References | Training CBT |

HOME | ADMINISTRATION | PROCESS FLOW | SHIPPING/RECEIVING | REPORTING
VIEW CONTAINER INVENTORY    VIEW CONTAINER ALLOCATION

Returnable Container Management System
View Container Inventory: Allocation Management
Specify a Container Allocation Report.                                    [Tips]

Report:  ○ Shipping versus Allocation   ○ Allocation Management   ● Shipping History go to bottom of page Specify the report criteria then select "Submit".

Associate       | All       |
Number:         | 0001263   |
                | 0001824   |

Supplier:       | All                |   [Lookup]          Container Type:  | All       |
                | 00000000 Supplier 1|                                      | AP PALLET |
                                                                            | A1 PALLET BOX |

Begin Date: [01/29/2003] □
                                              Date Range:
                                                            End Date:   [02/04/2003] □

[Submit]  [Reset]

FROM FIG-20A

Shipping History Report — 382

Associate No.: All    Container Type: All
Supplier: All    Date Range: 01/29/2003 to 02/04/2003 go to bottom of page

| Supplier | Cont. Type | Ship From | Truck or Trucks | Depart Date Time | Calc. Qty. | Actual Qty. | Discr. Qty. | Assoc. No. | BOL No. |
|---|---|---|---|---|---|---|---|---|---|
| 00000000 Supplier 1 | AP | NKP RCC | 1/1 | 01/29/2003 20:09 | 0 | 4 | 4 | – | 566 |
| 00000000 Supplier 1 | AP | NKP RCC | 1/1 | 01/30/2003 21:44 | 0 | 7 | 7 | – | 617 |
| 00000000 Supplier 1 | AP | NKP RCC | 1/1 | 01/31/2003 21:19 | 0 | 4 | 4 | – | 669 |
| 00000000 Supplier 1 | C | NKP RCC | 1/1 | 01/29/2003 20:09 | 0 | 0 | 0 | – | 566 |
| 00000000 Supplier 1 | C | NKP RCC | 1/1 | 01/30/2003 21:44 | 0 | 0 | 0 | – | 617 |
| 00000000 Supplier 1 | C | NKP RCC | 1/1 | 01/31/2003 21:19 | 0 | 0 | 0 | – | 669 |
| 00000000 Supplier 1 | C2 | NKP RCC | 1/1 | 01/29/2003 20:09 | 1902 | 96 | -1806 | – | 566 |
| 00000000 Supplier 1 | C2 | NKP RCC | 1/1 | 01/30/2003 21:44 | 1782 | 168 | -1614 | – | 617 |
| 00000000 Supplier 1 | C2 | NKP RCC | 1/1 | 01/31/2003 21:19 | 1606 | 96 | -1510 | – | 669 |
| 00000000 Supplier 1 | D1 | NKP RCC | 1/1 | 01/29/2003 20:09 | 0 | 0 | 0 | – | 566 |
| 00000000 Supplier 1 | D1 | NKP RCC | 1/1 | 01/30/2003 21:44 | 0 | 0 | 0 | – | 617 |
| 00000000 Supplier 1 | D1 | NKP RCC | 1/1 | 01/31/2003 21:19 | 0 | 0 | 0 | – | 669 |

384    386    388

[Print Report]  [Cancel]    return to top of page

FIG-20B

SYSTEM AND METHOD FOR MANAGING RETURNABLE CONTAINERS

FIELD OF THE INVENTION

The present invention relates generally to systems and methods for managing returnable containers. Specifically, it relates to a computerized system and method for categorizing returnable containers and managing an inventory of returnable containers according to the categories so that an adequate number of containers is allocated to each supplier in a manufacturer's parts supply chain.

BACKGROUND OF THE INVENTION

Many manufacturers use returnable or reusable containers to facilitate the flow of parts for the manufacturing process. The containers are used to transport parts from suppliers' facilities to the manufacturer's facility. Once the full containers that have been received from the suppliers are unloaded, they are typically transported to a returnable container center (RCC) at or near the manufacturer's facility where they are prepared for shipment back to the suppliers. The suppliers then reload the containers with parts and the full containers are transported to the manufacturer's facility.

Different types of containers are allocated to suppliers based on the type of parts that each supplier produces and delivers to the manufacturer. Some supplier's may require "specials" (e.g., specially adapted containers) while others may use "generics" (e.g., modular totes, pallets, or racks). Most of the containers may be used interchangeably by many of the manufacturer's suppliers. It is not necessary for each supplier to have a dedicated set of containers of a particular type. As along as the supplier receives containers of a suitable type for transporting the parts to the manufacturer's facility, any set of containers of that type may be shipped to the supplier for packaging the parts.

Allocation of containers to suppliers is often accomplished as follows. A manufacturer may operate a RCC at the manufacturer's facility where the containers (e.g., modular totes, pallets, racks, etc.) are pooled. A monthly forecast is used to generate a daily average for allocation of containers to each supplier. Each supplier's allocated quantity is based on full production days for the month (daily average allocation× number of full days). This quantity represents the supplier's proposed inventory of containers. Part receipts at the manufacturing facility (e.g., based on review of part supply orders) are used to reduce each supplier's inventory. Shipped quantities (based on the supplier's allocated quantity) are immediately moved into the supplier's inventory after RCC loads the truck with the supplier's allocation of containers. As a result, the container inventory is only visible in relation to the supplier and is only an estimated quantity at the RCC.

For a manufacturer with multiple facilities, each RCC facility may be using a different calculation to allocate container shipments to suppliers. For example, one facility may use estimated quantities based on the daily average allocation and number of full days as explained above and a spreadsheet program to track estimated and actual quantities. Other facilities may use a special computer program. In some instances, however, no computerized tracking may occur so the manufacturer's associates simply guess what each supplier's requirements will be. The guess may not be as accurate as the estimated quantity based on the daily average allocation and number of full days. Finally, a manufacturer's facility may choose to return to a supplier every container that it receives from the supplier on the assumption that the supplier will require the same number of containers that it used for the previous shipment.

None of the methods that are currently used support automated and accurate allocation and tracking of containers. More importantly, they do not result in allocation of containers according to the supplier's needs as they relate to the manufacturer's actual production needs. The calculation method of allocation based on averages instead of actual production needs results in an over allocation of containers to suppliers who may not need them and an insufficient allocation of containers to suppliers who may need them. The monthly averages do not account for fluctuations in daily demand for parts that may occur in the actual production schedule.

Furthermore, there is no accountability for shipped or misshipped quantities from the manufacturer's RCC. There is no visibility of inventory movements or verifications to or from the supplier, internal to the manufacturer, or in-transit. Finally, there is no visibility to the entire system inventory across manufacturing. Although attempts may be made to rely on data in part supply orders, the order data does not always reflect the actual container types shipped causing further errors. In addition, there is no supplier visibility to allocated quantities. Inaccurate allocation quantities are sent to suppliers causing inventory buildup at the suppliers' or the manufacturer's facilities.

Failure to allocate and track and therefore, maintain an adequate inventory of containers may be costly to the manufacturer, especially when the manufacturer owns the containers and must account for costs associated with use of the containers. If the manufacturer maintains a container inventory that is too low to meet the needs of the suppliers (and therefore meet its production schedule), costs may increase because production is delayed as the manufacturer waits for parts. If production delays result from an improper allocation of containers, the manufacturer may choose to order more containers (often at a higher cost because the order must be expedited) in order to get the parts in a timely manner. If the manufacturer maintains a container inventory that is too high, it simply wastes money by storing and maintaining more containers than are really needed. Therefore, there is a need for a returnable container management system and method that supports the allocation and tracking of containers according to a manufacturer's production needs.

SUMMARY OF THE INVENTION

The present invention is a system and method for allocating and managing returnable containers according to actual part requirements determined by a manufacturer's production schedule. It aids the manufacturer's associates and its suppliers in accurately allocating and tracking returnable containers. It maintains the correct allocation of containers to suppliers during demand changes so that parts are received as needed for the manufacturing process. Because the allocation of containers is determined according to the manufacturer's production schedule, it reduces the need to maintain an inventory of returnable containers, and therefore, reduces production costs.

The present invention is a returnable container management (RCM) system and method that provides a dynamic web-based environment to allow all entities within a manufacturer's parts supply chain to view and manage returnable container inventories. The environment provides a manufacturer's associates and suppliers with maintenance capabilities to move and adjust container inventory throughout the entire parts supply chain. It also provides each supplier with access to view inventory that is in-transit to its facility as well as what is believed to be at its facility. The submission of on-line "shipment discrepancies" and "adjustment requests" are used by the supplier to manage any deviations between the actual and planned inventory quantities.

Returnable container movement is controlled through the use of "process flows" and their relationship with physical locations called "inventory holding areas." An inventory holding areas reflects the quantity of returnable containers that are held within that portion of the supply chain. Each of these portions is represented by an "inventory holding area type." Business rules are created and programmed into the RCM system and method based on the function of the inventory holding area types and the relationships between each other. These relationships are used to maintain consistent process flow creation and understanding between a manufacturer's facilities and supplier companies. A number of containers adequate to maintain the demand for parts according to the manufacturer's production schedule are allocated to each supplier. Movements of the containers are tracked to ensure each supplier has at all times a physical inventory of containers that is adequate to ship parts in a timely manner to the manufacturer's facilities.

BRIEF DESCRIPTION OF THE DRAWINGS

FIG. 5 is a block diagram of key system components for an example embodiment of the present invention;

FIG. 6 is a create inventory holding area screen for an example embodiment of the present invention;

FIGS. 7A and 7B are is a create process flow screen for an example embodiment of the present invention;

FIGS. 8A and 8B are a maintain supplier profile screen for an example embodiment of the present invention;

FIGS. 9A-9C are a maintain inventory holding areas screen for an example embodiment of the present invention;

FIGS. 10A and 10B are a sample bill of lading (BOL) for an example embodiment of the present invention;

FIGS. 11A and 11B are a receipt verification screen for an example embodiment of the present invention;

FIGS. 12A, 12B, 13A, and 13B are report discrepancies screens for an example embodiment of the present invention;

FIGS. 14A, 14B, 15A, and 15B are request adjustment screens for an example embodiment of the present invention;

FIGS. 16A and 16B are a pending adjustments screen for an example embodiment of the present invention;

FIGS. 17A and 17B are a supplier's on-hand inventory screen for an example embodiment of the present invention;

FIGS. 18A-18C are a shipping versus allocation report screen for an example embodiment of the present invention;

FIGS. 19A and 19B are an allocation management report screen for an example embodiment of the present invention; and FIGS. 20A and 20B are a shipping history screen for an example embodiment of the present invention.

DESCRIPTION OF EXAMPLE EMBODIMENTS

The present invention is a returnable container management system and method that comprises a flexible and configurable tool to manage the returnable container process flow at a manufacturing facility regardless of the facility process and physical configuration as well as a tool to manage the container across all of a manufacturer's facilities. It provides a standard calculation for the supplier container allocation according to inventory movement, daily or weekly production forecasts, and safety stock information allowing for partial days, which yields an allocation based on actual part requirements according to the manufacturer's production schedule. It further provides a standard calculation for the container inventory at any identified stage of the container process flow according to inventory movement and safety stock information. It allows suppliers to verify their on-hand inventory and request adjustments online and understand their allocation quantity calculation. It provides the ability to record daily container process flow events of inbound and outbound shipments, shipment discrepancies, and inventory adjustments. Finally, it provides reporting, modeling, and forecasting capabilities to effectively manage the container process flow and container inventory and allocation eliminating guesswork.

Process flow information is used to determine how and where containers are used by the manufacturer in managing its supply chain. In addition, it allows the manufacturer to understand how quickly parts (and therefore, containers) reach a destination in the supply chain. The availability of containers for supplier shipments is affected by the amount of time it takes to fill containers at the supplier's facility, transport the parts to the manufacturer's facility, consume the parts at the manufacturer's facility, and transport the empty containers from the manufacturer's facility to the supplier's facility. For example, containers that are transported directly to the manufacturer's facility may be returned to the supplier's facility more quickly than containers that are transported to a supply consolidation center before being transported to the manufacturing facility. In addition, the container needs of suppliers that ship to a supply consolidation center in addition to shipping directly to the manufacturer's facility directly may differ from the container needs of suppliers that ship only to the manufacturer's facility. Because the availability of containers is affected by their "flow" in the manufacturer's parts supply chain, the process flow of containers is analyzed to determine the appropriate allocation of containers to suppliers.

Figure 1:
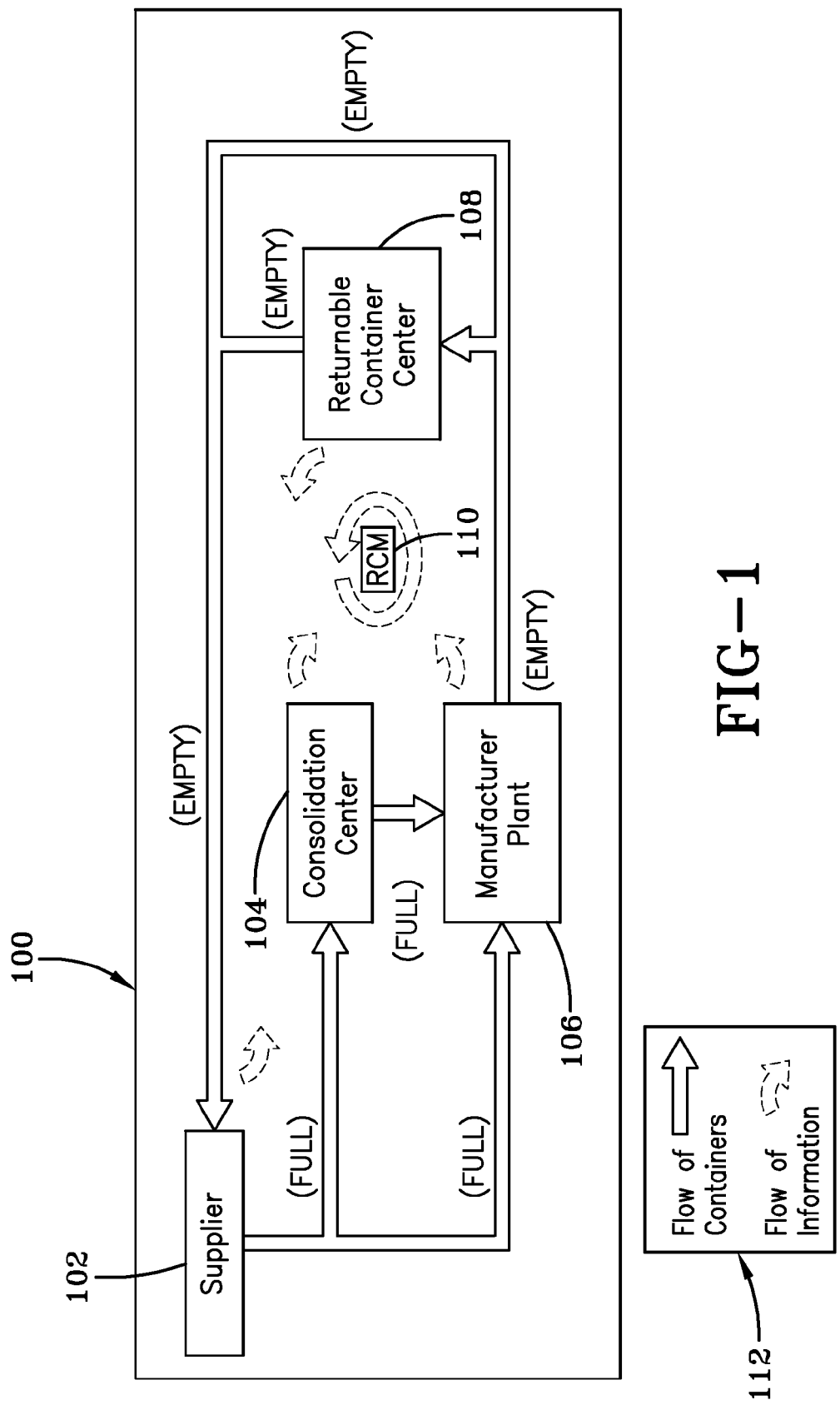
FIG. 1 is a returnable container flow analysis diagram for an example embodiment of the present invention.

Referring to FIG. 1, a returnable container flow analysis diagram for an example embodiment of the present invention is shown. The container and information flows 112 of FIG. 1 identify the movement of containers through the manufacturer's parts supply chain. The manufacturer's suppliers 102 provide full containers of parts that are delivered directly to the manufacturer's facility 106 or to a supply consolidation center 104 where they are staged for delivery to one or more of the manufacturer's facilities 106. The containers are emptied at the manufacturer's facility 106 and then transported to a returnable container center (RCC) 108. In some instances, the empty containers (e.g., "supplier specific" containers or "special" containers) may by-pass the RCC 108 and be returned directly to the supplier 102. Supplier specific containers may be used for instances in which the supplier requires a unique container to ship its parts. Such containers are not pooled for distribution to any supplier because they can be used by only one supplier.

Information regarding the full containers shipped by the suppliers 102 is entered into a computerized returnable container management (RCM) system 110. Additional information is entered into the RCM system 110 when the parts are received by the manufacturer (at the supply consolidation center 104 or the manufacturing facility 106). Information regarding the empty containers is entered when the containers are received by the RCC 108 and when they are shipped to the suppliers 102 from either the manufacturer facility 106 or the RCC 108.

Because the present invention is Internet based, suppliers have access to information regarding the quantities of containers that have been allocated to them. Suppliers further use the system to view information regarding verification of shipments. Detailed shipment documents provide means for identifying, troubleshooting, and resolving container shipment discrepancies. Inventory movements and supplier access to container shipments provide means for communicating inaccuracies at the time they occur. Inventory movements are visible, with date and time stamps, and include container shipments to and from suppliers, container movements between the manufacturer's facilities, detailed quantities in-transit (full and empty) to and from suppliers. The manufacturer's associates can obtain detailed information about problems and resolve them quickly. The RCM system further supports identification of pooled and supplier specific containers/racks to facilitate their return to suppliers.

The following tables show details of the flow analysis of FIG. 1.

TABLE 1

| | Responsibility | Planned Activity | Impact of Deviation |
|---|---|---|---|
| Manufacturer's Facility | Shipments (empty) | Identify actual quantities shipped (accuracy) | Inaccurate inventory levels within system (potential surplus or shortage at supplier) |
| | | Ship during scheduled window times (timely) | Suppliers inventory low/short due to in-transit delays |
| | Receipts (full) | Receive actual quantities shipped (accuracy) | Inaccurate inventory levels within system (potential surplus or shortage at supplier) |
| | | Unload trailers to fulfill production needs (timely) | Appropriate trailers are not available to ship containers |
| | EDI Accuracy | Ensure part supply order information is accurate to the order | Electronic data is not available for receipts |
| | Parameter Control | Maintain parameters to meet supply chain needs | Inventory unbalanced throughout chain causing shortage/surplus |
| | Produce product | Meet Scheduled Production | Deviations from planned receipt/shipment activity, supply chain unbalanced |
| | Maintain production plans | Maintain agreed to production levels/mix | Inventory unbalanced throughout chain causing shortage/surplus |

TABLE 2

| | Responsibility | Planned Activity | Impact of Deviation |
|---|---|---|---|
| Consolidation Center | Receipts | Receive actual quantities shipped (accuracy) | Inaccurate inventory levels within system (potential surplus or shortage at supplier) |
| | | Unload trailers to fulfill production needs (timely) | Appropriate trailers are not available to ship containers |
| | Abnormal Shipping Notification | Notify appropriate parties of packaging shortage | No one prepared to repack or expedite needed quantities |

TABLE 3

| | Responsibility | Planned Activity | Impact of Deviation |
|---|---|---|---|
| Supplier | EDI Accuracy | Ensure order information is accurate to the order | Electronic data is not available for receipts |
| | Shipments | Identify actual quantities shipped (accuracy) | Inaccurate inventory levels within system (potential surplus or shortage at supplier) |
| | | Ship during scheduled window times (timely) | Down stream delays to other suppliers, receipts, etc |
| | Receipts | Verify actual quantities shipped (accuracy) | Inaccurate inventory levels w/in system (potential surplus or shortage at supplier) |
| | | Unload trailers to meet planned window times (timely) | Trailers delayed going to other locations |

TABLE 3-continued

| Responsibility | Planned Activity | Impact of Deviation |
| --- | --- | --- |
| Abnormal Shipping Notification | Notify appropriate parties of packaging shortage | No one prepared to repack or expedite needed quantities |

TABLE 4

| | Responsibility | Planned Activity | Impact of Deviation |
| --- | --- | --- | --- |
| Returnable Container Center | Shipments | Identify actual quantities shipped (accuracy) | Inaccurate inventory levels within system (potential surplus or shortage at supplier) |
| | | Ship during scheduled window times (timely) | Suppliers inventory low/short due to in-transit delays |

TABLE 5

| | Responsibility | Planned Activity | Impact of Deviation |
| --- | --- | --- | --- |
| Logistics | Determine Allocation | Purchase container quantities to support planned allocation levels based on facility, supplier requirements | Inaccurate inventory levels within system (potential surplus or shortage at supplier |
| | Monitor/maintain Supplier Inventory | Conduct cycle count activities and adjust system to reflect actual situation | Inaccurate inventory levels within system (potential surplus or shortage at supplier) |
| | Abnormal Shipping Notification | Notify appropriate parties of packaging shortage | No one prepared to repack or expedite needed quantities |

Figure 2:
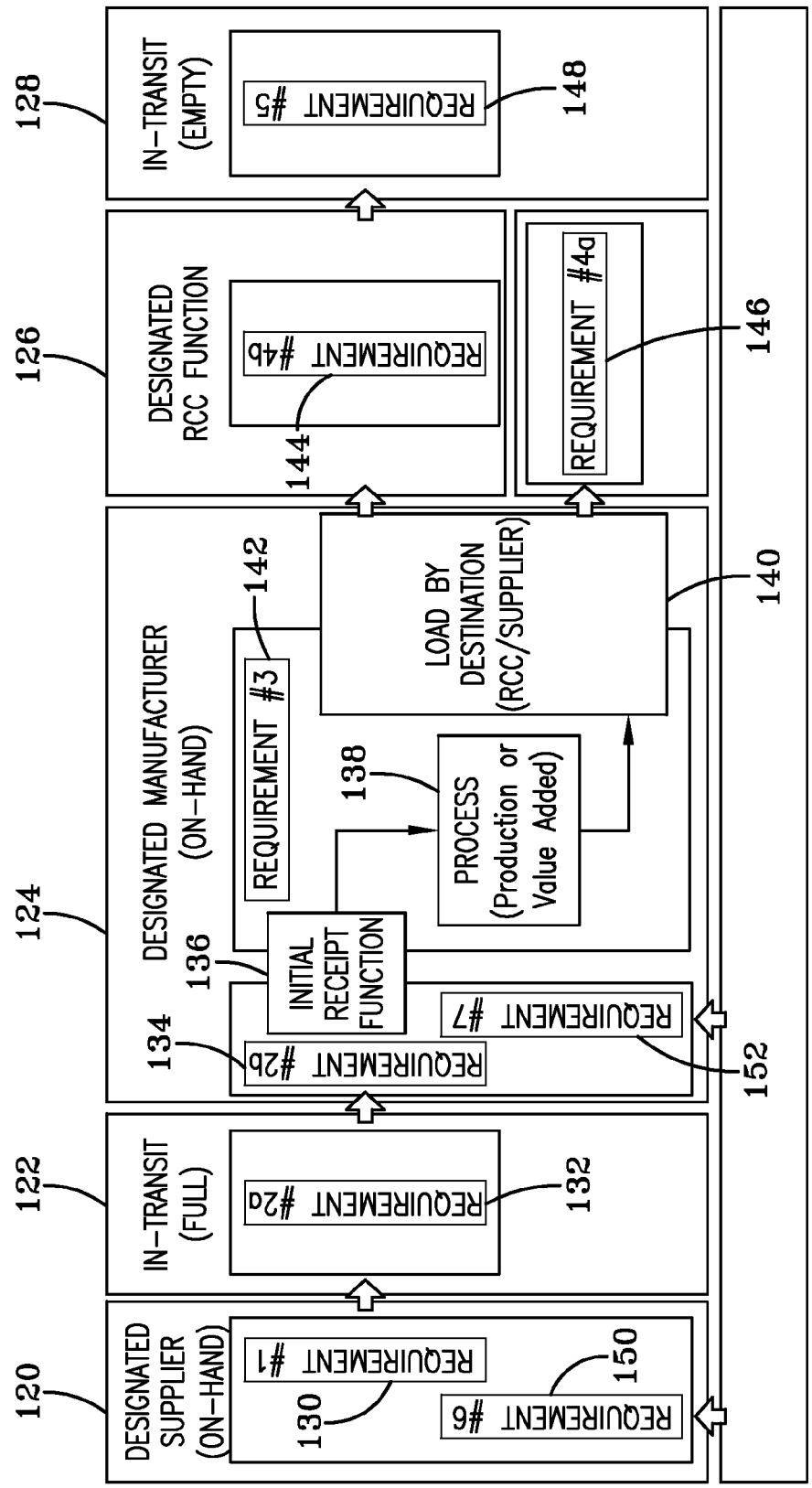
FIG. 2 is a process flow diagram for RCM inventory identification for an example embodiment of the present invention.

Referring to FIG. 2, a process flow diagram for RCM inventory identification for an example embodiment of the present invention is shown. FIG. 2 further illustrates the flow of container inventory from one physical location (called an "inventory holding area") to another. The inventory holding areas provide details regarding process flows and container types that are actually moving through the system. "Requirements" as shown in FIG. 2 facilitate the identification of inventory throughout the physical locations or inventory holding areas so that an accurate accounting of containers may be determined. First, the designated supplier on-hand quantity 120 is verified by the supplier 130. The supplier on-hand quantity 120 includes empties ready for production, full containers waiting for shipment, and partials that may be used for small lot packing. Next, the in-transit full quantity 122 representing containers shipped from the supplier to the designated manufacturer is determined based on electronic data interchange (EDI) part supply order information sent by the supplier 132. The transfer of container inventory from the supplier in-transit full 122 to the designated manufacturer on-hand 124 is determined next. The manufacturer on-hand quantity 124 includes full containers waiting for assembly line side delivery, empties being processed at the RCC, and partials waiting assembly line side or in repack areas. Additional in-bound shipments or receipts (initial receipt function 136) as well as out-bound shipments (load destination RCC/supplier 140) are also considered in determining a designated manufacturer on-hand quantity 124. An in-transit empty quantity based on a container shipment from the designated manufacturer directly to the supplier reduces the on-hand inventory 146. Shipment receipts into the RCM system may be based on a transfer of inventory 144 from the designated manufacturer on-hand 124 to the RCC 126 to trigger a reduction of designated manufacturer on-hand inventory. Finally, in-transit empty quantity 128 to the supplier on-hand quantity 120 is determined 148 as well as receipt into the supplier's on-hand inventory 120 (transfer inventory from RCC/designated manufacturer on-hand to supplier 150) and receipt into a special area (transfer inventory from RCC on-hand to designated manufacturer on-hand 152). The in-transit empty quantity 128 is based on empty containers that have shipped and are still in route to a supplier and containers in route to a supplier with return parts.

Figure 3:
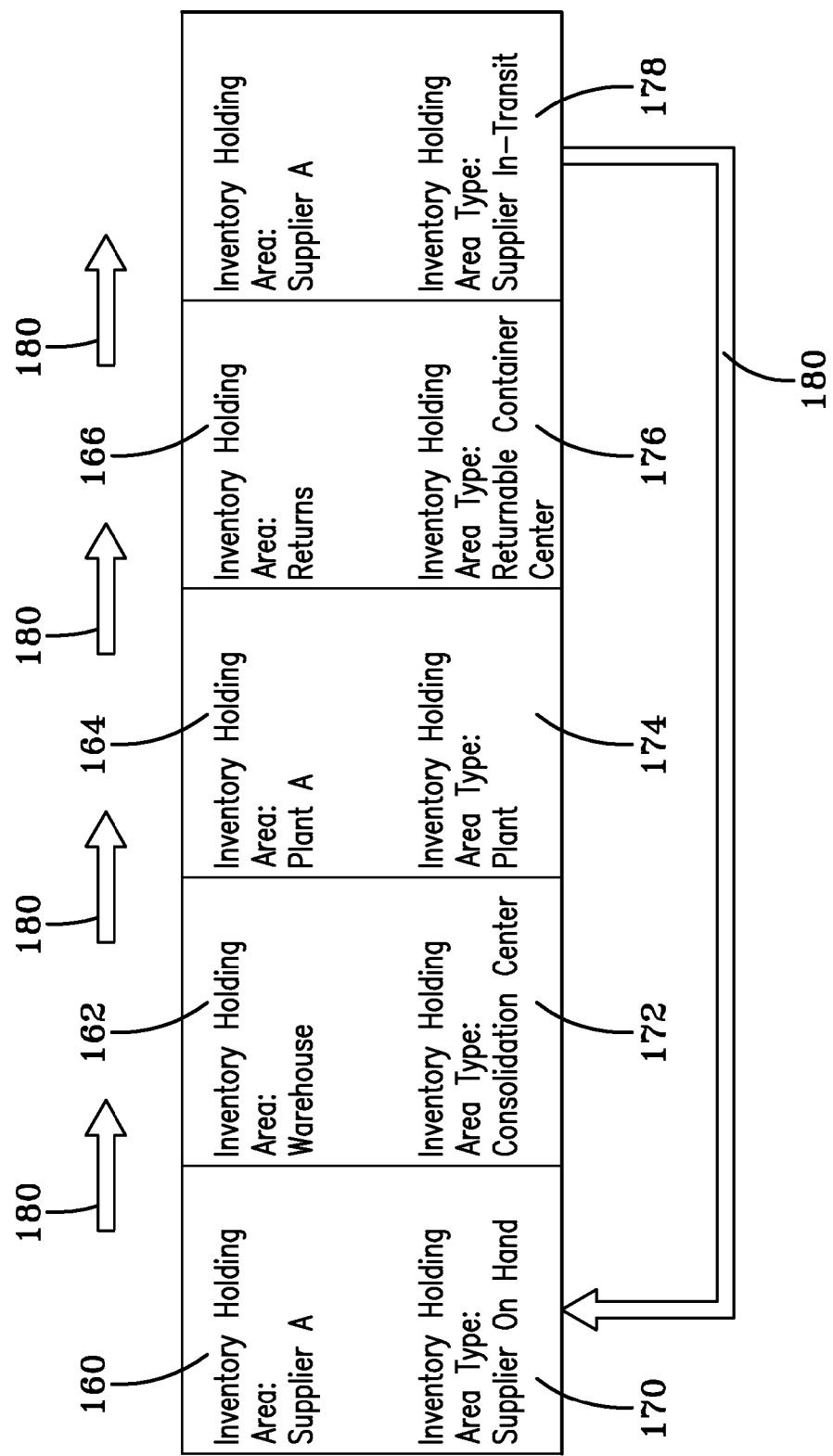
FIG. 3 is a returnable container flow analysis illustrating inventory holding areas for an example embodiment of the present invention.

Referring to FIG. 3, a returnable container flow analysis illustrating inventory holding areas for an example embodiment of the present invention is shown. Returnable container movement according to the present invention is controlled through the use of "process flows" 180 and their relationship with the "inventory holding areas" (physical locations) 160, 162, 164, 166. Inventory holding areas hold containers and reflect the quantity of returnable containers that are held within that portion of the supply chain. Each of these portions is represented by an "inventory holding area type" 170, 172, 174, 176, 178. According to an example embodiment of the present invention, inventory holding areas (container physical locations) in which containers may be stored before being moved to another location include a supplier's facility (supplier A) 160, a manufacturer's parts staging center (warehouse) 162, a manufacturer's production facility (plant A) 164, and a returns location 166. Associated with each inventory holding area is an inventory holding area type. Inventory holding area types associated with a supplier 160 include "supplier on hand" (SOH) 170, which represents containers physically at a supplier location, including any in-transit to the manufacturer, and "supplier in-transit empty" (SIE) 172, which represents containers that are being transported from the manufacturer to the supplier. Both inventory holding area types for suppliers are considered part of a supplier's allocation. Inventory holding area types associated with a manufacturer's parts staging center (warehouse) 162 include "consolidation center" (CC) 172. Inventory holding area types associated with a manufacturer's production facility 164 include "plant" 174. Inventory holding area types associated with a container returns location 166 include "returnable container center" (RCC) 176.

Figure 4:
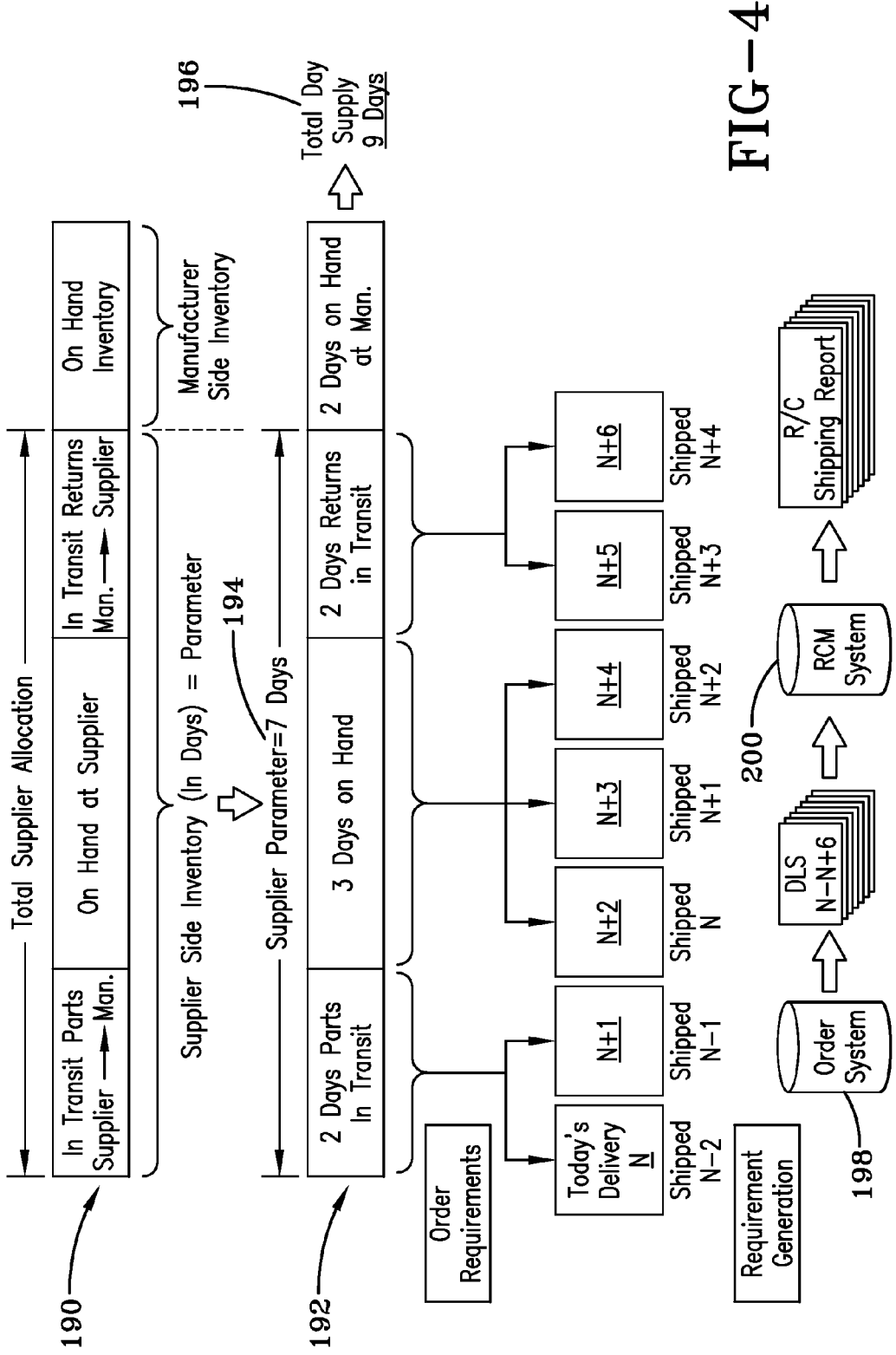
FIG. 4 is a block diagram illustrating the allocation of containers to suppliers for an example embodiment of the present invention.

Referring to FIG. 4, a block diagram illustrating the allocation of containers to suppliers is shown. Allocation of containers is based on actual part requirements. The manufacturer uses its production schedule to determine its need for parts over a given time period (e.g., for a week). Part supply orders are transmitted to suppliers based on the manufacturer's production schedule so that the manufacturer receives the parts that are required to meet its production needs. Allocation of containers to suppliers is based on order system data 198 regarding the parts that have been ordered from each supplier according to the manufacturer's production schedule.

Historical data regarding the time required by the supplier to produce and transport the parts to the manufacturer and for the manufacturer to consume the parts 192 are analyzed to determine a total day supply 196 for use in determining container allocations. For example, if it takes four days to transport containers between the supplier's facility and the manufacturer's facility (two days parts in transit and two days on-hand at manufacturer), three days for the supplier to produce the parts and load the containers (three days on-hand at supplier's facility), and two days for the manufacturer to consume the parts and prepare the containers to be returned to the supplier (two days on-hand at manufacturer's facility), then the total day supply is nine days 196. A "supplier parameter" or "standard allocated days" 194 of seven days represents the number of days that the container is in the supplier's inventory (whether in-transit or at the supplier's location). The number of containers to be released to the supplier (calculated allocation quantity) is then based on the parts requirements from the supplier orders and the supplier parameter (number of days the containers are on the supplier's side of allotment). The actual number of containers released is based on the calculated allocation quantity less the supplier on-hand quantity on the supplier's side. Using data from the order system 198, the RCM system 200 calculates a "standard allocated days" value for each supplier that is used to determine the calculated allocation quantity for each supplier.

Referring to FIG. 5, a block diagram of key system components for an example embodiment of the present invention is shown. RCM data 210 comprises part demand and part supply order data as well as part, supplier, and packaging information and transportation information. This data is used to determine the types of containers required by the suppliers and each supplier's allocation of containers (calculated allocation quantity). The RCM system 212 determines container allocations according to the following formula:

(supplier's "standard allocated days"×part demand)−
on-hand containers at supplier The result represents the container quantity to be returned to the supplier. A return returnable container forecast by the manufacturer facility is based on the percentage of inbound containers at each facility. The parameters or values maintained by the RCM system 212 include the standard day's allocation by plant and the supplier/container type and quantity. If the containers are "supplier specific" or "special" such that the same containers are always shipped to the supplier, the shipping responsibility is provided. A critical inventory level (representing the percentage of total allocation) is maintained. Finally, return transit information for anticipated arrival of containers is maintained.

Web access 214 is provided to users of the system including the manufacturer's associates and suppliers. The manufacturer's associates may access information related to:

On-hand inventory at all of the manufacturer's facilities;
Distribution quantity by supplier and container;
Live "shipped" status for returnable containers due;
Supplier "standard allocated days"; and
Part and container information.

In addition the manufacturer's associates may create records of outbound shipments.

Suppliers may access information related to their own on-hand inventory and in-transit inventory, their required quantity, and their standard allocated days. In addition, suppliers may communicate to the manufacturer on-hand discrepancies and log returned returnable container shipments.

Container inventory is visible at each of the manufacturer's facilities and at supplier locations through detailed reports and maintenance sessions. The actual quantity of containers at various physical locations (called "inventory holding areas") received is easily visible on selected reports. The following reports may be generated using the RCM system of the present invention.

TABLE 6

| | |
|---|---|
| Activity Report 216 | Measure volume of returns managed by location Trend analysis by location |
| Exception Report 218 | Distribution not met Critical inventory level Negative distribution quantity No requirements by supplier Open inbound inventory status (past anticipated arrival) |
| Maintenance Activity 220 | Report changes to "key" fields on-hand quantities allocation days tracking system parameters |
| Custom Report 222 | Report defined for specific department or plant use |

Referring to FIG. 6, a create inventory holding area screen for an example embodiment of the present invention is shown. To create an inventory holding area (inventory bucket), a user enters a name for the inventory holding area (inventory bucket) and selects a type of holding area (inventory bucket type) 230. The types may include RCC (returnable container center), CC (consolidation center), SOH (supplier on-hand), SIE (supplier in-transit), etc. For type SOH or SIE, the user may select the appropriate supplier from a list. The address for the selected supplier is entered automatically 232.

Referring to FIG. 7A, a create process flow screen for an example embodiment of the present invention is shown. The user selects a process flow type from a list of types 240. The selected process flow type is based on the inventory holding areas that should be included in the process flow. For example, a process flow type of SOH-CC-PLT-RCC indicates that containers flow from the supplier's on-hand (SOH) inventory holding area to a parts consolidation center (CC) inventory holding area to the manufacturer's plant (PLT) inventory holding area to a returnable container center (RCC) inventory holding area and finally to the supplier's in-transit (SIE) inventory holding area.

Next, the user is prompted to provide a name for the process flow and to information regarding the inventory holding areas to include in the flow 242. The user may also provide a description of the process flow. Relationships within the flow are displayed to user 244 and indicate where the containers are transported at each step in the flow. For example, for the relationship SOH-CC, containers are moved the SOH inventory holding area that the user identified previously "supplier1" to the CC inventory holding area that the user identified previously "TP1." Finally, the user may select the container types that are tracked with the process flow 246 as shown in FIG. 7B.

Referring to FIG. 8A, a maintain supplier profile screen for an example embodiment of the present invention is shown. This screen allows an administrator of the RCM system to enter search criteria based on a supplier name or number 250. The screen displays the search results 252. The user may select a supplier from the search results 252 and update the supplier contact information 254 and contracted container types 256 as shown in FIG. 8B.

Referring to FIG. 9A, a maintain inventory holding areas screen for an example embodiment of the present invention is shown. The user may select options for searching inventory holding areas including the specification of an inventory holding area name and inventory holding area type 260. The "process flow" shown in this section relates to the flow of containers from one inventory holding area to another based on the selected holding area name and type. The process flow information indicates where parts from the supplier flow in the supply chain (e.g., to a parts consolidation center, directly to the manufacturer's facility, etc.) and may be used to calculate an allocation quantity for the supplier.

Referring to FIG. 9B, records that match the user's selection criteria are displayed on the screen 262. The user may select one of the records and update the inventory holding area information associated with the selected record 264. Referring to FIG. 9C, the screen further displays details regarding the container process flow for the selected inventory holding area and type 266. For example, a supplier-on-hand (SOH) inventory may flow from the SOH holding area to the manufacturer's parts consolidation center (CC) to the manufacturer's plant (PLT) and finally, to the manufacturer's RCC.

Referring to FIG. 10A, a sample bill of lading (BOL) for an example embodiment of the present invention is shown. The BOL may be generated in response to a container ship request that is completed by a manufacturer associate. The BOL identifies the supplier to which the containers will be shipped 270 as well as details regarding the number of containers, type of containers, and description of containers 272. Referring to FIG. 10B, the shipping order further specifies detailed information regarding the party shipping the containers 274.

Figure 11B:
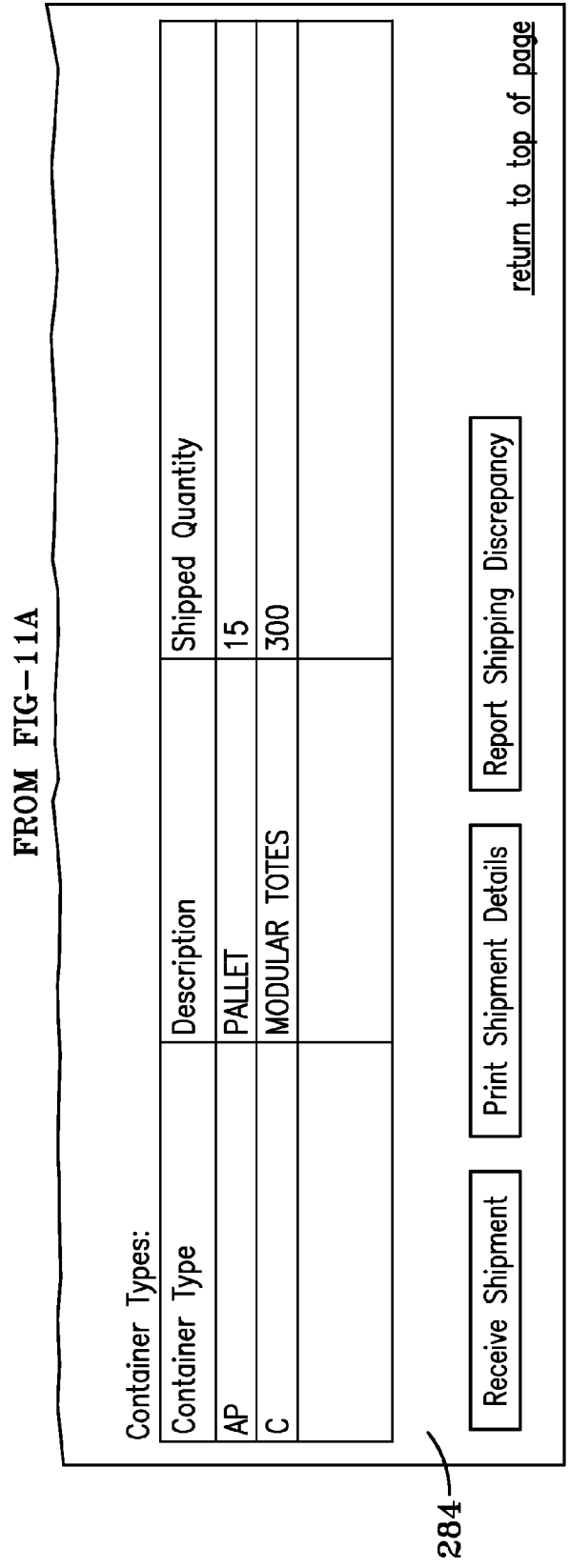

Referring to FIGS. 11A and 11B, a receipt verification screen for an example embodiment of the present invention is shown. Referring to FIG. 11A, the user may view and modify received shipments that need to be verified. The screen provides a list of records from which a user may select 280. The user may then view details regarding a selected shipment 282. The details indicate the receipt status, associated bill of lading number, departure date and time, truck and trailer information, ship from and ship to locations, and receipt information. Referring to FIG. 11B, the user may select the "receive shipment" option 284 to indicate that the quantity shipped actually matches the BOL quantity. The shipment is then removed from the list. If there are differences between the BOL and the actual quantity received, a receiving discrepancy may be filed by the supplier.

Referring to FIGS. 12A, 12B, 13A, and 13B, report discrepancies screens for an example embodiment of the present invention are shown. The user may view past shipments 290 as shown in FIG. 12A. Upon selection of a record, the user may view details regarding the selected shipment 292 and select the "report shipping discrepancy" option 294 to proceed to the screens of FIGS. 13A and 13B.

Referring to FIG. 13A, the user may view details regarding the shipment 300 and enter information regarding the discrepancy 302. For each container type, the user may then enter the actual quantity received next to the container type 304. If an unknown container type arrives at the supplier's facility, information regarding the unknown container type may be entered and reported to the manufacturer 306 as shown in FIG. 13B.

Referring to FIGS. 14A, 14B, 15A, and 15B, request adjustment screens for an example embodiment of the present invention are shown. Referring to FIG. 14A, when the request adjustment option is selected 310, past discrepancy reports are automatically displayed 312. For each selected record, as shown in FIG. 14B, details are shown that include the request date and time, supplier name, request type, status, and shipment data (BOL number, departure date and time, ship from and to locations) 314. Finally, the details of the discrepancy (e.g., shipped quantity and received quantity) are shown 316.

Referring to FIG. 15A, the user may enter details regarding the requested adjustment 320. The user may specify a supplier identifier 320 and data regarding the container types and system on-hand inventory as well as functional on-hand inventory (containers that may be used for production) and damaged on-hand inventory (containers that cannot be used for production) 322.

Referring to FIGS. 16A and 16B, a pending adjustments screen for an example embodiment of the present invention is shown. A list of pending adjustments is displayed 330 as shown in FIG. 16A. The user may select a record and view details regarding the selected record 332 as shown in FIG. 16B.

Referring to FIGS. 17A and 17B, a supplier's on-hand inventory screen for an example embodiment of the present invention is shown. Referring to FIG. 17A, the user may specify selection criteria (e.g., container type and inventory holding area type) 340 and view details regarding the quantity of containers that meet the selection criteria 342. Referring to FIG. 17B, each container type may have a total of four quantities listed: supplier on-hand (SOH), supplier in-transit empty (SIE), supplier in-transit full (SIF), and the total of the SOH, SIE, and SIF. The SIF quantity indicates the number of containers in-transit to the manufacturer and is considered part of the SOH quantity until shipment receipts are verified by the manufacturer. Once the shipment receipts are verified, the SIF quantity is deducted from the SOH quantity.

Referring to FIGS. 18A-18C, a shipping versus allocation report screen for an example embodiment of the present invention is shown. After specifying report criteria as shown in FIG. 18A, this report shows the supplier's allocated quantity by container and manufacturer facility 350 as shown in FIG. 18B. It also shows what percentage of the allocation is filled with the supplier's current inventory levels. There are two types of allocation: "allocation requirement quantity" 354 and "allocation level" 352. "Allocation requirement quantity" 354 is based on a given number of containers that must be maintained for the supplier. "Allocation level" 352 is based on actual orders and shipping requirements that are sent from the manufacturer's purchasing department to the supplier. When viewing the "allocation level" 352, a quantity needed for a range of dates is shown. This quantity may change based on fluctuations in demand.

Selecting a record results in the display of details 356 as shown in FIG. 18C. Past shipments for the container type selected are displayed 358. Shipment dates and times are shown as well. The calculated quantity 360 is the system generated quantity needed to fulfill the allocations. The actual quantity 362 reflects the number of containers actually shipped. A discrepancy quantity 364 shows the overstock or under stock of containers in relation to the actual quantity. A "safety stock quantity" 366 may also be maintained for intermittent problems. In an example embodiment of the present invention, this report is updated frequently (e.g., every hour or two hours) to reflect parts shipments that are received by the manufacturer.

Referring to FIGS. 19A and 19B, an allocation management report screen for an example embodiment of the present invention is shown. The allocation management report presents a historical record of changes to the supplier's allocation. The user may specify selection criteria including a date range and types of transactions 370 as shown in FIG. 19A. The screen then displays data related to the user's selection criteria 372 as shown in FIG. 19B.

Referring to FIGS. 20A and 20B, a shipping history screen for an example embodiment of the present invention is shown. The shipping history report displays details of all shipments made by the manufacturer over a selected period of time. The user may specify selection criteria such as a supplier, container type, and date range 380 as shown in FIG. 20A. The shipping history report 382 of FIG. 20B shows calculated quantities 384 and actual quantities 386 as well as a discrepancy 388 that reflects the difference between the calculated and actual quantities.

The present invention comprises a computerized RCM system for managing the flow of returnable containers in a manufacturer's parts supply chain. It determines an appropriate allocation of containers for each supplier in the supply chain and accounts for the flow of containers at various physical locations (inventory holding areas) to ensure that each supplier has an adequate supply of containers to maintain the manufacturer's production needs. The example screens of the present invention that have been presented help to explain the returnable container management concepts of the present invention. A RCM system according to the present invention may comprise many additional screens to facilitate computer interactions including administration screens that allow an administrator to manage user accounts, interactions with other systems (e.g., part supply order databases), etc.

While example embodiments of the invention have been illustrated and described, various modifications and combinations can be made without departing from the spirit and scope of the invention. For example, the number and the related categories and types of containers that are managed according to the present invention may be increased or decreased. In addition, the screens that are presented to users of the system and method may be modified or organized in many other ways to accomplish the same goals. Modifications, combinations, and equivalents to the system and method of the present invention are intended to be covered and claimed.

What is claimed is:

1. A computerized method for managing returnable containers in a manufacturer's supply chain to facilitate allocation of containers to a plurality of suppliers in response to a manufacturer's demand for parts from suppliers according to said manufacturer's production schedule comprising:
creating at least one container inventory holding area in said manufacturer's supply chain;
storing at said container inventory holding area a plurality of containers for use by a plurality of suppliers in said manufacturer's supply chain;
calculating a supplier on-hand container inventory quantity for each of said plurality of suppliers;
calculating a container allocated days number for each of said plurality of suppliers, said container allocated days number for each supplier comprising a number of days a container remains in said supplier's on-hand container inventory in response to said manufacturer's demand for parts over a specified period of time, said container allocated days number calculated by said manufacturer;
calculating a parts demand value for each of said plurality of suppliers, said parts demand value for each supplier calculated according to said manufacturer's actual requirement for parts from said supplier according to said manufacturer's production schedule, said parts demand value calculated by said manufacturer;
entering in a database at a computer said:
(a) supplier on-hand container inventory quantity for each of said plurality of suppliers;
(b) a container allocated days number for each of said plurality of suppliers; and
(c) a parts demand value for each of said plurality of suppliers;
calculating at said computer by said manufacturer a container allocation quantity for each of said plurality of suppliers, wherein said container allocation quantity for each supplier varies for each supplier according to:
(1) said supplier's parts demand value as determined by said manufacturer's production schedule; and
(2) said supplier's container allocated days number;
calculating at said computer by said manufacturer for each of said plurality of suppliers an actual container quantity according to said container allocation quantity and said supplier on-hand container inventory quantity for each of said suppliers; and
releasing from said container inventory holding area to each of said plurality of suppliers a number of containers equal to said actual container quantity wherein said containers are released by said manufacturer according to said actual container quantity calculated by said manufacturer.

2. The method of claim 1 wherein calculating for each of said plurality of suppliers a container allocated days number comprises determining a process flow of containers for each of said plurality of suppliers.

3. The method of claim 1 further comprising adjusting said actual container quantity for one of said plurality of suppliers based on a request from said supplier.

4. The method of claim 1 wherein said supplier on-hand container inventory quantity comprises empty containers at said supplier's facility and full containers waiting to ship.

5. The method of claim 4 wherein said supplier on-hand inventory container quantity further comprises empty containers in-transit to said supplier's facility and full containers in-transit to said manufacturer's facility.

6. The method of claim 1 wherein said inventory holding area is of the type returnable container center.

7. A computerized returnable container management system to facilitate allocation of containers to a plurality of suppliers in response to a manufacturer's demand for parts from suppliers according to said manufacturer's production schedule comprising:
a container inventory holding area;
a plurality of containers at said container inventory area, said containers for use by a plurality of suppliers in said manufacturer's supply chain;
a supplier on-hand container inventory quantity calculated by said manufacturer for each of said plurality of suppliers;
a container allocated days number calculated by said manufacturer for each of said plurality of suppliers wherein said number for each supplier comprises a number of days a container remains in said supplier's on-hand container inventory;

a parts demand value for each of said plurality of suppliers wherein said value for each supplier is calculated according to said manufacturer's actual requirement for parts from said supplier according to said manufacturer's production schedule;

a container allocation quantity calculated by said manufacturer for each of said plurality of suppliers wherein said quantity for each supplier varies according to said supplier's parts demand value and said supplier's container allocated days number;

an actual container quantity calculated by said manufacturer for each of said plurality of suppliers based on said supplier's container allocation quantity and said supplier's on-hand container inventory quantity;

a database at a computer for storing said supplier on-hand container inventory quantity, said container allocated days number, said parts demand value, said container allocation quantity, and said actual container quantity for each of said plurality of suppliers; and a software application at said computer for determining when to release from said container inventory holding area to each of said plurality of suppliers a number of containers equal to said actual container quantity wherein said manufacturer releases said containers.

8. The system of claim 7 wherein calculating for each of said plurality of suppliers a container allocated days number comprises determining a process flow of containers for each of said plurality of suppliers.

9. The system of claim 7 further comprising adjusting said actual container quantity for one of said plurality of suppliers based on a request from said supplier.

10. The system of claim 7 wherein said supplier on-hand container inventory quantity comprises empty containers at said supplier's facility and full containers waiting to ship.

11. The system of claim 10 wherein said supplier on-hand inventory container quantity further comprises empty containers in-transit to said supplier's facility and full containers in-transit to said manufacturer's facility.

12. The system of claim 7 wherein said inventory holding area is of the type returnable container center.

* * * * *

UNITED STATES PATENT AND TRADEMARK OFFICE
CERTIFICATE OF CORRECTION

PATENT NO. : 7,650,297 B1  Page 1 of 1
APPLICATION NO. : 10/728322
DATED : January 19, 2010
INVENTOR(S) : Baker et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1162 days.

Signed and Sealed this

Twenty-third Day of November, 2010

David J. Kappos
*Director of the United States Patent and Trademark Office*